(12) United States Patent
Ramachandran

(10) Patent No.: US 7,624,804 B2
(45) Date of Patent: Dec. 1, 2009

(54) METHOD FOR RECOVERING OIL FROM A GAS-LIFTED OIL WELL PENETRATING A SUBTERRANEAN OIL-BEARING FORMATION

(75) Inventor: Sunder Ramachandran, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 203 days.

(21) Appl. No.: 11/761,227

(22) Filed: Jun. 11, 2007

(65) Prior Publication Data

US 2007/0246222 A1 Oct. 25, 2007

Related U.S. Application Data

(63) Continuation-in-part of application No. 10/477,241, filed on Nov. 10, 2003, now abandoned.

(60) Provisional application No. 60/291,160, filed on May 15, 2001.

(51) Int. Cl.
*C09K 8/94* (2006.01)
*E21B 43/00* (2006.01)
*F04F 1/08* (2006.01)

(52) U.S. Cl. .................. 166/309; 166/372; 417/55; 507/202; 507/244; 507/247; 507/254

(58) Field of Classification Search .................. None
See application file for complete search history.

(56) References Cited

U.S. PATENT DOCUMENTS

| | | | |
|---|---|---|---|
| 2,168,116 A | 8/1939 | Crites et al. ................ 166/21 |
| 3,718,585 A | 2/1973 | Lummus et al. .......... 252/8.5 C |
| 3,750,753 A | 8/1973 | Bernard .................... 166/309 |
| 3,770,055 A | 11/1973 | Larsen ................. 166/244 C |
| 3,963,377 A | 6/1976 | Elliott et al. ................ 417/90 |
| 4,326,411 A | 4/1982 | Gant et al. ................. 73/155 |
| 4,454,918 A | 6/1984 | Richardson et al. ......... 166/303 |
| 4,480,697 A | 11/1984 | Goldaniga et al. .......... 166/372 |
| 4,624,745 A | 11/1986 | Sande et al. ............... 162/252 |
| 4,711,306 A | 12/1987 | Bobo ....................... 166/372 |
| 5,100,582 A | 3/1992 | Bhattacharyya ............. 252/340 |
| 5,117,909 A | 6/1992 | Wilton et al. .............. 166/277 |
| 5,465,416 A | 11/1995 | Yanagimoto ................ 455/327 |
| 5,474,127 A | 12/1995 | White ....................... 166/120 |
| 5,871,048 A | 2/1999 | Tokar et al. ................ 166/263 |
| 6,025,426 A | 2/2000 | Hurlock .................... 524/458 |
| 6,190,561 B1 | 2/2001 | Nagan ....................... 210/665 |
| 6,460,632 B1 | 10/2002 | Chatterji et al. ............. 175/66 |
| 2007/0079963 A1* | 4/2007 | Yang et al. ................. 166/270 |

FOREIGN PATENT DOCUMENTS

WO WO02/092963 11/2002

OTHER PUBLICATIONS

M.G. Bernadiner, *Foamed Gas Lift*, SPE 21639, Production Operations Symposium, Apr. 7-9, 1991, pp. 75-81, 5 Figs.

* cited by examiner

*Primary Examiner*—George Suchfield
(74) *Attorney, Agent, or Firm*—Mossman Kumar & Tyler PC

(57) ABSTRACT

In a method for optimizing gas lift operations in the production of crude oil, a surfactant is injected with the lift gas into the an oil well such that the surface tension between the lift gas and the formation fluid being produced is reduced and/or a lift gas-formation fluid foam is formed. The reduction in surface tension and/or foam formation increases the efficiency of the lift gas for lifting the formation fluid to the surface. The surfactant is selected to minimize corrosion. The surfactants consist essentially of sultaines, hydroxy sultaines, and their salts. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims. 37 CFR 1.72(b).

8 Claims, No Drawings

METHOD FOR RECOVERING OIL FROM A GAS-LIFTED OIL WELL PENETRATING A SUBTERRANEAN OIL-BEARING FORMATION

CROSS REFERENCE TO RELATED APPLICATIONS

This application is a continuation-in-part of co-pending U.S. patent application Ser. No. 10/477,241; which application takes priority from U.S. Provisional Patent Application Ser. No. 60/291,160 filed May 15, 2001, and assigned to the assignee of this application.

BACKGROUND OF THE INVENTION

1. Field of the Invention

The present invention relates to a method of producing crude oil. The present invention particularly relates to a method of producing crude oil using a gas lift process.

2. Background of the Art

Oil from oil bearing earth formations is usually first produced by the inherent formation pressure of the oil bearing earth formations. In some cases, however, the oil bearing formation lacks sufficient inherent pressure to force the oil from the formation upward to the surface. In other cases, the inherent pressure of an oil-bearing formation can be expended prior to the recovery of all of the recoverable oil so that when the pressure of the production zone has been reduced by continued withdrawal, the well will stop flowing. When this occurs, artificial methods of lifting the oil from the formation to the surface are usually employed.

One method of continuing production is to provide mechanical pumping operations wherein the pump is located at the surface. In U.S. Pat. No. 3,963,377 to Elliott, et al., a pneumatically powered submerged pump for lifting high viscosity oil from an oil well is disclosed. Another popular method for achieving production from wells that no longer are capable of natural flow is by the gas lift method.

Gas injection into an oil well is a well-known artificial lift method for facilitating oil recovery from the oil well. This method is commonly referred to as gas lift recovery or, most often, simply as a gas lift. A typical gas lift method provides a lift gas at the surface that is conveyed to a surface wellhead connection where the lift gas is injected into the casing-tubing annulus of the well. Upon injection, the lift gas travels down the casing-tubing annulus to a plurality of specially designed subsurface gas injection valves that enable the lift gas to enter the tubing string. The lift gas commingles with the formation fluids in the tubing string, lifting the formation fluids up the tubing string to the surface.

As is taught in U.S. Pat. No. 5,871,048 to Tokar, et al., there are significant operational costs associated with gas injection. In Tokar, a method for automatically determining an optimum gas rate is disclosed. While determining the optimum gas flow is an important element in gas lift methods, it is by no means the only factor that should be considered when optimizing a gas lift method for recovering oil from an oil well.

It would be desirable in the art of producing oil from oil wells to economically produce oil using a gas lift method. It would be particularly desirable to reduce the cost of producing crude oil using a gas lift method of recovery. Accordingly, it is desirable to economically optimize the gas injection lift method such that the operational costs for the well are balanced with the oil production revenue from the well.

SUMMARY OF THE INVENTION

In one aspect the invention is a method for recovering oil from a gas-lifted oil well penetrating a subterranean oil-bearing formation, the method comprising: A) providing a lift gas and a surfactant at an oil well wherein the oil well penetrates a subterranean oil-bearing formation and has formation fluids in the well bore; B) injecting a lift gas into the oil well; and C) injecting a surfactant into the oil well, wherein i) the surfactant functions to: (a) reduce the surface tension between the formation fluids and the lift gas; (b) create a lift gas-formation fluid foam; or (c) both (a) and (b); ii) the surfactant and lift gas are injected into the oil well at a depth sufficiently deep to lift formation fluids to the surface; and iii) the surfactant consists essentially of a member selected from the group consisting of sultaines and all salts thereof, hydroxy sultaines and all salts thereof, and mixtures thereof.

DETAILED DESCRIPTION OF THE PREFERRED EMBODIMENTS

In one embodiment, the present invention in a method for recovering oil from a gas-lifted oil well penetrating a subterranean oil-bearing formation. The present invention can be used with any gas lift method known to be useful to those of ordinary skill in the art of producing oil. For example the method of the present invention can be used with the gas lift method disclosed in U.S. Pat. No. 5,871,048 to Tokar, et al.

In Tokar, a method for automatically determining an optimum gas injection rate for a gas-lifted oil well is disclosed. The optimum gas-lift slope for the oil well is initially provided and stored in the memory of a programmable logic controller. A lift gas is injected into the well at an initial gas injection rate to displace a liquid at an initial liquid production rate from the well. The initial liquid production rate and initial gas injection rate are stored in the memory. Thereafter, the lift gas is injected into the well at a first incremental gas injection rate differing from the initial gas injection rate by a first incremental value. Additional liquid is displaced from the well at a first incremental liquid production rate and the first incremental liquid production rate and first incremental gas injection rate are stored in the memory. The first incremental slope is determined from the stored data points and compared to the optimum gas-lift slope. The procedure is repeated for a second incremental gas injection rate, wherein the second incremental value is selected as either positive or negative in response to the comparison of the first incremental slope and the optimum gas-lift slope. The second incremental slope is determined from the stored data points and compared to the optimum gas-lift slope. In response to this comparison, the first incremental gas injection rate is determined to be the optimum gas injection rate or the above-recited procedure is repeated for a third incremental gas injection rate and additional incremental gas injection rates, if necessary, until an incremental gas injection rate is determined to be the optimum gas injection rate.

The method of the present can also be use with less complex gas lift methods. The present invention can be used with any gas lift method as long as the gas lift method serves the functions of lifting formation fluids to the surface which then results in a lower pressure at the producing strata which in turn results in an increased inflow of formation fluids into the well bore. In all of these methods, the gas injection is done a depth sufficient to lift formation fluid to the surface and allow for the inflow of additional formation fluid into the well bore. Any combination equipment and methods can be used with the present invention as long as it meets these two basic criteria.

In another embodiment, the present invention is a method for recovering oil from a gas-lifted oil well including the step of injecting a lift gas into the oil well. Any lift gas known to be useful to those of ordinary skill in the art of using gas lift recovery methods can be used with the present invention. One gas commonly used as a lift gas with the present invention is natural gas, preferably that recovered from the same formation as the well subject to the gas lift method. Other gases can also be used including those selected from the group consisting of carbon dioxide, methane, ethane, propane, nitrogen, and mixtures thereof. Any gas that is not detrimental to the formation, such as oxygen, can be used with the present invention.

In yet another embodiment, the present invention is a method for recovering oil from a gas-lifted oil well including the step of injecting a surfactant into the oil well. The surfactants useful with the present invention function to reduce the surface tension between the lift gas and the formation fluid being lifted to the surface and/or create a foam of the lift gas and the formation fluid. This decreased surface tension and/or foam formation allows for a decrease in the density of the formation fluid which results in an increase in lift efficiency.

The present invention can reduce the cost of recovery of oil from a gas-lift oil well in at least two ways. A first way that the costs can be reduced in recovering oil from a well wherein the rate of recovery is limited by the amount of gas that can be injected, is by increasing the amount of formation fluids being recovered per unit of gas used. With the method the present invention, oil is recovered more quickly reducing the duration of the maintaining the well with its incumbent costs.

A second way that the present invention can reduce production costs is, in a well wherein the rate of recovery in not limited by the amount of gas which can be injected, is by reducing the amount of gas which must be injected. Since the lift gas lifts more efficiently, less gas is needed to lift the same amount of formation fluids as compared to a conventional gas lift well operation. Particularly in applications wherein there is not sufficient gas available from the formation being produced and other gasses such as nitrogen or carbon dioxide is being purchased, this can result in a substantial savings as compared to conventional gas lift technology. For purposes of the present application, the term formation fluids means those fluids produced from a oil bearing subterranean formation including but not limited to oil, natural gas, water and the like.

In addition to decreasing the surface tension between the formation fluid and lift gas, the surfactants useful with the method of the present invention preferably are non-corrosive. Such surfactants include all sultaines and all salts thereof, and all hydroxy sultaines and all salts thereof.

The surfactant formulations useful with the present application, when prepared with a surfactant, are prepared using solvents that do not strip off at the formation temperature or well operating temperature. Failure to use such surfactants will leave residue on the gas lift system choking the system. In the method of the present invention, the surfactant is preferably formulated using solvents, if any, which will not leave residue on the gas lift system.

Preferably, the surfactants used with the method of the present invention are thermally stable at the formation temperature or well operating temperature of the well being treated. Failure to use such surfactants can lead to the loss of efficiency of the gas lift system as the surfactants break down. Surfactant break down products can also cause problem downstream. As such temperatures can exceed 250° F. (121° C.) and even reach 300° F. (149° C.) and above, it is preferable that for high temperature environments, the surfactant be a sultaine or a hydroxy sultaine or salt thereof.

When the surfactant is a sultaine salt, it preferably has the general formula:

$$RCONH(CH_2)_m N^+(CH_3)_2 CH_2 CH(OH)SO_3^-$$

wherein R is a hydrocarbon side chain, and m varies from 1-100. The counter ion may be any including Na+, K+ and the like.

When the surfactant is a hydroxy sultaine salt thereof, it preferably has the general formula:

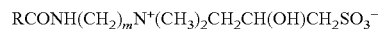

$$RCONH(CH_2)_m N^+(CH_3)_2 CH_2 CH(OH)CH_2 SO_3^-$$

where R is as previously defined. The counter ion may be any including Na+, K+ and the like.

The hydrocarbon side chains designated as R in the above general formulae are, in some embodiments, aliphatic linear or branched chains having from 2 to 20 carbons. In some embodiments, the side chains are linear alkanes have from 10 to 16 carbons. In one embodiment, the side chain is a lauryl ($C_{12}$) group.

The surfactants useful with the method of the present invention consist essentially of sultaines, hydroxy sultaines and salts thereof. They may include a solvent and also other additives and stabilizers. The surfactants useful with the present invention do not include others surfactants except in minimal and unsubstantial amounts. For example, in one embodiment of the invention, the surfactant includes less than 10 percent by weight of total surfactant weight, any surfactant other than the sultaines, hydroxy sultaines and salts thereof described hereinabove. In another embodiment that amount is less than 5 percent by weight. In still another embodiment, the amount is less than 1 percent by weight.

Those of ordinary skill in art of performing gas lift operations on oil wells know how to determine the desired level of surfactants to be used with the present invention. For example, in one embodiment, the operator may elect to start feeding a fixed amount of surfactant and then, by trial and error, make adjustments to optimized feed levels in view of changes to production rates. In other embodiment, the operator of the well may choose to perform a test modeling his well in order to predict an optimum feed rate. Variables associated with an oil well that may affect dosing levels of the additives may include the type of hydrocarbon being produced, the quantity of hydrocarbon being produced, the quantity of brine present in the production fluid, the presence of inorganic materials in the brine, the pressure of the reservoir, the amount of gas that can be injected down hole, and the like.

Where, in the practice of the method of the present invention, the surfactants function to create a foam, it is sometimes desirable to break the foam after it is recovered from the well. The term "breaking a foam", for the purposes of the present invention, means to separate the gaseous component of the foam from the liquid component. Any method known to be useful to those of ordinary skill in the art of breaking foams such as those sometimes formed in the practice present invention can be used with the present invention, including both chemical and mechanical methods.

EXAMPLE

The following example is provided to illustrate the present invention. The example is not intended to limit the scope of the present invention and should not be so interpreted. Amounts are in weight parts or weight percentages unless otherwise indicated.

Example 1

The product available form Baker Petrolite having the trade designation "FMW3064" is a mixture of water and 40 percent lauryl hydroxy sultaines. It was injected into a gas lifted oil well in Alabama. The surfactant was injected through the gas lift valves at rates of between 6 gallons per day to 20 gallons per day. It was observed during the operation of the well using the FMW3064 product that the lift gas pressure could be reduced by 250 psi.

What is claimed is:

1. A method for recovering oil from a gas-lifted oil well penetrating a subterranean oil-bearing formation, the method comprising:
   A) providing a lift gas and a surfactant at an oil well wherein the oil well penetrates a subterranean oil-bearing formation and has formation fluids in the well bore;
   B) injecting a lift gas into the oil well; and
   C) injecting a surfactant into the oil well,
   wherein
   i) the surfactant functions to:
      (a) reduce the surface tension between the formation fluids and the lift gas;
      (b) create a lift gas-formation fluid foam; or
      (c) both (a) and (b);
   ii) the surfactant and lift gas are injected into the oil well at a depth sufficiently deep to lift formation fluids to the surface; and
   iii) the surfactant consists essentially of a member selected from the group consisting of sultaines and all salts thereof, hydroxy sultaines and all salts thereof, and mixtures thereof.

2. The method of claim 1 wherein the lift gas is selected from the group consisting of natural gas, carbon dioxide, methane, ethane, propane, nitrogen, and mixtures thereof.

3. The method of claim 2 wherein the lift gas is natural gas or nitrogen.

4. The method of claim 1 wherein the surfactant is prepared using solvents that do not strip off at the formation temperature or well operating temperature of gas-lifted oil well.

5. The method of claim 1 wherein the surfactant is selected to have a temperature stability at or above the formation temperature or well operating temperature of gas-lifted oil well.

6. The method of claim 5 wherein the formation temperature or well operating temperature of gas-lifted oil well exceeds 250° F.

7. The method of claim 6 wherein the formation temperature or well operating temperature of gas-lifted oil well exceeds 300° F.

8. The method of claim 1 wherein the surfactant is lauryl hydroxy sultaine.

* * * * *